(12) United States Patent
Santos et al.

(10) Patent No.: US 11,169,285 B2
(45) Date of Patent: Nov. 9, 2021

(54) FAST NEUTRON SPECTROMETER AND DETECTOR

(71) Applicant: Centre National De La Recherche Scientifique, Paris (FR)

(72) Inventors: Daniel Santos, Biviers (FR); Olivier Guillaudin, Claix (FR); Nadine Sauzet, Voreppe (FR)

(73) Assignee: Centre National De La Recherche Scientifique, Paris (FR)

( * ) Notice: Subject to any disclaimer, the term of this patent is extended or adjusted under 35 U.S.C. 154(b) by 0 days.

(21) Appl. No.: 16/630,613

(22) PCT Filed: Jul. 9, 2018

(86) PCT No.: PCT/EP2018/068508
§ 371 (c)(1),
(2) Date: Jan. 13, 2020

(87) PCT Pub. No.: WO2019/011841
PCT Pub. Date: Jan. 17, 2019

(65) Prior Publication Data
US 2020/0158897 A1  May 21, 2020

(30) Foreign Application Priority Data

Jul. 13, 2017 (FR) .................................. 1756703

(51) Int. Cl.
  *G01T 3/00* (2006.01)
(52) U.S. Cl.
  CPC .............. *G01T 3/001* (2013.01); *G01T 3/008* (2013.01)

(58) Field of Classification Search
  CPC ................................ G01T 3/008; G01T 3/001
  See application file for complete search history.

(56) References Cited

U.S. PATENT DOCUMENTS

| | | | | |
|---|---|---|---|---|
| 9,170,340 B1* | 10/2015 | Derzon | .................... | G01T 3/008 |
| 2006/0017000 A1* | 1/2006 | Martoff | ................. | G01T 1/2935 250/390.02 |
| 2010/0258734 A1* | 10/2010 | McCormick | ............ | G01T 3/008 250/390.01 |
| 2016/0018538 A1* | 1/2016 | Bendahan | ............... | G01T 3/008 250/390.01 |
| 2016/0349384 A1* | 12/2016 | McKinny | ................ | G01T 3/008 |

FOREIGN PATENT DOCUMENTS

EP  2708918 A1  3/2014

OTHER PUBLICATIONS

Maire et al., "Neutron Energy Reconstruction and Fluence Determination at 27 keV with the LNE-IRSN-MIMAC MicroTPC Recoil Detector," IEEE Transactions on Nuclear Science, vol. 63, No. 3, published Jun. 22, 2016. (Year: 2016).*

(Continued)

*Primary Examiner* — Yara B Green
(74) *Attorney, Agent, or Firm* — Alston & Bird LLP

(57) ABSTRACT

A device for measuring the energy of neutrons incident in a first direction is provided. The device comprises a gas between a cathode and an anode, the anode comprising a matrix array of electron detectors, the first direction being orthogonal to the anode-cathode direction.

12 Claims, 2 Drawing Sheets

(56) References Cited

OTHER PUBLICATIONS

Maire, D. et al., "First Measurement of a 127 keV Neutron Field with a µ-TPC Spectrometer", IEEE Transactions on Nuclear Science, vol. 61, No. 4, (dated Aug. 2, 2014), pp. 2090-2096.
Roccaro, A. et al., "A background-free direction-sensitive neutron detector", Nuclear Instruments and Methods in Physics Research A, vol. 608, No. 2, (dated Jul. 10, 2009), pp. 305-309.
International Search Report and Written Opinion for Application No. PCT/EP2018/068508 dated Sep. 5, 2018, 16 pages.

\* cited by examiner

FAST NEUTRON SPECTROMETER AND DETECTOR

CROSS-REFERENCE TO RELATED APPLICATIONS

The present application is a national phase entry of PCT/EP2018/068508, filed on Jul. 9, 2019, which claims the benefit of priority of French Patent Application No. 1756703, filed Jul. 13, 2017, the entire contents of which are hereby incorporated by reference in their entirety for all purposes.

FIELD

The present application relates to a device for detecting and measuring the energy of neutrons.

BACKGROUND

Certain applications, such as medical radiotherapy, radiographic testing (on building sites for example) or in the nuclear industry, use neutron sources. In these applications, it is useful to know the energy of the emitted neutrons, for example in order to be able to estimate the dose of ionizing radiation received by a patient or by an operator.

In other applications such as, for example, the fight against terror, it is sought to detect the presence of fissile materials, and to do so the energy of the neutrons emitted by such fissile materials is detected in order to determine the nature thereof.

FIG. 1 is a schematic cross-sectional view of a device for measuring neutron energy, which was for example employed in Maire et al., IEEE Transactions On Nuclear Science, Vol. 61., Nov. 4, 2014.

The device comprises an enclosure 100, which is for example cylindrical, containing a gas 102. Two electrodes, a cathode 104 and an anode 106, are located inside the enclosure 100, and for example form opposite parallel ends of a cylindrical field cage 108 of same axis 109 as the enclosure. The interior of the cage 108 is filled with the gas 102. The field cage 108 is configured so that a uniform or almost uniform electric field is generated in the cage when a supply voltage is applied across the electrodes 104 and 106. The anode 106 comprises electron detectors (not shown) arranged in a matrix array. The cage 108 and the matrix array are connected to a supply and processing circuit 110 (SPLY PRCS).

In operation, the electrodes are supplied by the circuit 110. The detector is oriented toward a neutron emitter such that the neutrons are incident in the anode-cathode direction.

A few of the incident neutrons collide with nuclei of the gas. Let one of these neutrons, n, of energy $E_n$, and which strikes a nucleus of the gas at a point 120, be considered. The nucleus receives a fraction of the energy $E_n$ and is projected with an angle θ with respect to the axis 109, the direction of incidence of the neutron. The struck nucleus, or recoil nucleus, then cedes its energy to the gaseous medium, thereby tearing electrons from atoms or molecules of the gas, which become ions. A trace of electron-ion pairs 102 (or ionized trace) results. The nucleus is braked each time it tears an electron from an atom or molecule. The trace stops at a point 124 where the recoil nucleus is no longer moving fast enough to tear other electrons from atoms or molecules. The angle θ between the direction of incidence of the neutrons and the direction of the trace is random and may therefore vary between collisions.

The electrons torn from the atoms or molecules, i.e. the electrons generated by ionization of the gas, are attracted to the anode, in the cathode-anode direction, by virtue of an electric field between the cathode and anode. The various electrons reached different positions on the matrix array of detectors at different times. The electrons generated at the point 120 reach a detector 126 of the matrix array after a travel time t0, and the electrons generated at the point 124 reach a detector 128 of the matrix array after a travel time t1. In practice, the time taken by the trace 122 to form is negligible with respect to the time taken by the electrodes to drift to the anode.

The circuit 110 measures the number $N_e$ of electrons that reach the matrix array of detectors, and the positions and the times of arrival of the electrons.

On the one hand, from the number of electrons $N_e$, the initial energy, which is related to the speed with which the recoil nucleus was propelled during the collision, is deduced using in succession the following relations:

$$E_i = N_e * \Delta E \quad (1)$$

and $$E_p = E_i / Q \quad (2)$$

where ΔE is the energy required to create an electron-ion pair in the gas, which is known and dependent on the nature of the gas, i.e. it is the energy that must be provided to generate an electron by ionization of the gas;

$E_i$ is the ionization energy that was ceded to the gaseous medium by the recoil nucleus during generation of the electron-ion pairs;

Q is the nuclear recoil ionization quenching factor, i.e. the ratio between the ionization energy $E_i$ of the trace and the initial energy $E_p$: it is lower than 1 because some of the initial energy $E_p$ is not used to ionize the gas.

On the other hand, the difference t0–t1 between the travel time t0 and t1 is computed. This difference is equal to the difference between the measured times of arrival at the detectors 126 and 128. From the difference t0–t1, from the speed (which is known) at which the electrons drifted to the anode, and from the distance between the detectors 126 and 128, the angle θ between the anode-cathode direction and the direction of the trace 122 is determined.

The energy $E_n$ of the incident neutron is determined from the energy $E_p$ of the recoil nucleus and from the angle θ via the relationship:

$$E_n = A \frac{E_p}{\cos^2 \theta} \quad (3)$$

where A is a constant number dependent on the ratio between the masses of the neutron and of the recoil nucleus.

One problem is that when it is a question of fast neutrons, for example of energy higher than 5 MeV, measurement of neutron energy using devices of the type described above is prone to various problems, typically to margins of error that run the risk of being of the order of the measurement itself. Received doses risk being poorly estimated, or the characterization of the neutron source risks being poor.

Now, it is known in the prior art to measure the energy of incident neutrons using a device in which solid polyethylene plates are introduced into a gas-filled cell (see EP 2708918 A1). The plates allow a neutron-energy cut-off threshold to be introduced and thus the energy of the incident neutrons to be determined. The use of such a solid converter however induces a substantial loss in the conversion efficiency of the nuclear recoil traces, particularly when it is a question of high-energy neutrons, this decreasing the precision of the measurement. In addition, this technique does not allow the traces left by the recoil nuclei to be reconstructed in 3D.

SUMMARY

Thus, one embodiment mitigates all or some of the drawbacks described above.

One embodiment provides a device allowing the energy of fast neutrons to be measured in a typically precise manner.

One embodiment provides a device allowing the energy of neutrons to be measured in a particularly precise manner, independently of whether they are fast or not.

One embodiment provides a device for measuring the energy of neutrons incident in a first direction, containing a gas between a cathode and an anode, the anode comprising a matrix array of electron detectors, the first direction being orthogonal to the anode-cathode direction.

According to one embodiment, the device comprises a circuit arranged to: a) measure the number, the positions and the times of arrival of electrons; b) determine, from the positions and times of arrival, the angle θ' between the first direction and the direction of an ionized trace left by a nucleus of said gas after collision with one of the neutrons; and c) determine the energy of the neutron from the number of electrons and the angle θ'.

According to one embodiment, said circuit is arranged to, in step c): determine, from the number of electrons $N_e$, the ionization energy of the trace $E_i$, via the relationship $E_i = N_e * \Delta E$, where $\Delta E$ is the energy required to create an electron-ion pair in the gas; and determine the energy $E_n$ of the neutron via the relationship:

$$E_n = A \frac{E_P}{\cos^2 \theta'}$$

where $E_p$ respects the relationship $E_p = E_i/Q(E_i)$, $Q(E_i)$ being the nuclear recoil quenching factor associated with the ionization energy of the trace $E_i$, and A is a constant coefficient dependent on the ratio between the mass of the neutron and the mass of said nucleus.

According to one embodiment, the device is furthermore suitable for measuring the energy of neutrons incident in a second direction, the second direction being parallel to the anode-cathode direction, said circuit being arranged to: a) measure the number, the positions and the times of arrival of the electrons; b') determine, from the positions and times of arrival, the angle θ between the second direction and the direction of an ionized trace left by a nucleus of said gas struck by one of the neutrons; and c') determine the energy of the neutron from the number of electrons and the angle θ.

According to one embodiment, said circuit is arranged to: determine, from the number of electrons $N_e$, the ionization energy of the trace $E_i$, via the relationship $E_i = N_e * \Delta E$, where $\Delta E$ is the energy required to create an electron-ion pair in the gas; and determine the energy $E_n$ of the neutron via the relationship:

$$E_n = A \frac{E_P}{\cos^2 \theta}$$

where $E_p$ respects the relationship $E_p = E_i/Q(E_i)$, $Q(E_i)$ being the nuclear recoil quenching factor associated with the ionization energy of the trace $E_i$, and A is a constant coefficient dependent on the ratio between the mass of the neutron and the mass of said nucleus.

According to one embodiment, said circuit comprises a rotary holder having an axis of rotation orthogonal to the first direction and to the second direction, a rotation of one quarter of a revolution about the axis of rotation making the device pass from an orientation in which the first direction is parallel to the direction of incidence of the neutrons to an orientation in which the second direction is parallel to the direction of incidence of the neutrons.

According to one embodiment, the cathode and the anode are located on opposite sides of a cylindrical field cage arranged to produce a uniform electric field.

According to one embodiment, the field cage has a diameter comprised between 10 and 35 cm and a length comprised between 15 and 35 cm.

According to one embodiment, the gas is a mixture of helium 4 and of $CO_2$ comprising between 4 and 6% $CO_2$.

According to one embodiment, the precision of the measurement of the times of arrival of the electrons is comprised between 16 and 40 ns.

One embodiment provides a method for measuring the energy of neutrons incident in a direction, comprising: a) providing a gas between a cathode and an anode, the anode comprising a matrix array of electron detectors; b) orienting the anode-cathode direction orthogonal to the direction of incidence of the neutrons; c) measuring the number and the positions and the times of arrival of electrons coming from gas on the matrix array; d) determining, from the positions and times of arrival, the angle θ' between the direction of incidence of the neutrons and the direction of an ionized trace (122) left by a nucleus of said gas (102) after collision with one of the neutrons ($n_h$); and e) determining the energy of the neutron from the number of electrons and from the angle θ'.

According to one embodiment, the method comprises, in step e): determining, from the number of electrons $N_e$, the ionization energy of the trace $E_i$, via the relationship $E_i = N_e * \Delta E$, where $\Delta E$ is the energy required to create an electron-ion pair in the gas; and determining the energy $E_n$ of the neutron ($n_h$) via the relationship:

$$E_n = A \frac{E_P}{\cos^2 \theta'}$$

where E respects the relationship $E_p = E_i/Q(E_i)$, $Q(E_i)$ being the nuclear recoil quenching factor associated with the ionization energy of the trace $E_i$, and A is a constant coefficient dependent on the ratio between the mass of the neutron and the mass of said nucleus.

According to one embodiment, the method furthermore comprises successively: b') orienting the anode-cathode direction parallel to the direction of incidence of the neutrons; and f) implementing steps c), d) and e).

BRIEF DESCRIPTION OF THE DRAWINGS

These features and advantages, and others, will be described in detail in the following description of particular nonlimiting embodiments, which is given with reference to the appended figures, in which.

DETAILED DESCRIPTION

Elements that are the same have been referenced with the same references in the various figures and, in addition, the various figures have not been drawn to scale. For the sake of clarity, only elements useful to the comprehension of the described embodiments have been shown and are detailed. In particular the gas enclosure, the field cage, the electrodes, the matrix array of electron detectors, and the supply and processing circuit have not been described in detail, production thereof based on the functional indications of the following description being within the ability of those skilled in the art.

In the following description, unless otherwise specified, the expression "of the order of" means to within 10%, and preferably to within 5%.

Figure 1:
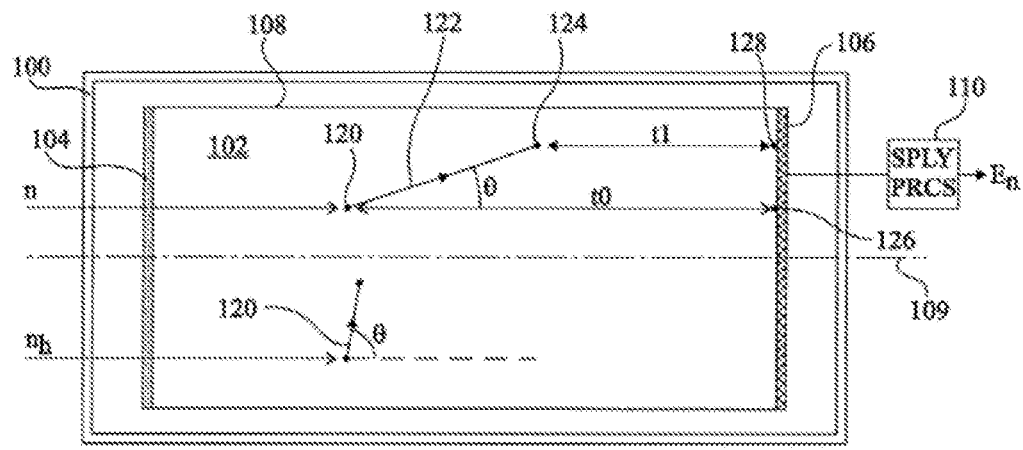
FIG. 1 is a schematic cross-sectional view of a device for measuring neutron energy.

It turns out that, with a device of the type illustrated in FIG. 1, it is not possible to correctly determine the energy $E_n$ when the incident neutrons are fast neutrons $n_h$ of energy for example higher than 5 MeV.

Specifically, the angle θ between the direction of incidence of the neutron and the trace 122 follows a probability law that depends on the nature of the gas and on the energy of the incident neutron. As is illustrated in the bottom left-hand portion of FIG. 1, for fast neutrons $n_h$, the angle θ has a high probability of being close to 90°. For example, for neutrons of energy higher than 100 MeV, the angle θ between the direction of incidence of the neutrons and the trace is almost never smaller than 80° when the nuclei of the gas have a mass higher than 1 GeV/c². Furthermore, when the recoil nucleus departs at an angle θ close to 90°, its initial energy $E_p$ is low and the trace is short, for example between 1 and 5 mm. As a result, when the angle θ is close to 90°, the times of arrival of the electrons at the anode detectors 126 and 128 get closer together. In practice, the values measured at these arrival times merge because of the limit of the precision of the measurement, which is typically of the order of 25 ns. If the computed difference t0–t1 between the travel times is zero, the determined value of the angle θ is equal to 90°. Relationship (3) then corresponds to a division by zero, and the energy $E_n$ of the neutron cannot be determined.

To solve this problem, it could be sought to measure the times of arrival of the electrons at the matrix array with a high precision, for example one better than 10 ns, or even 1 ns, without decreasing the number of detectors of the matrix array. This would cause various technical problems.

Figure 2:
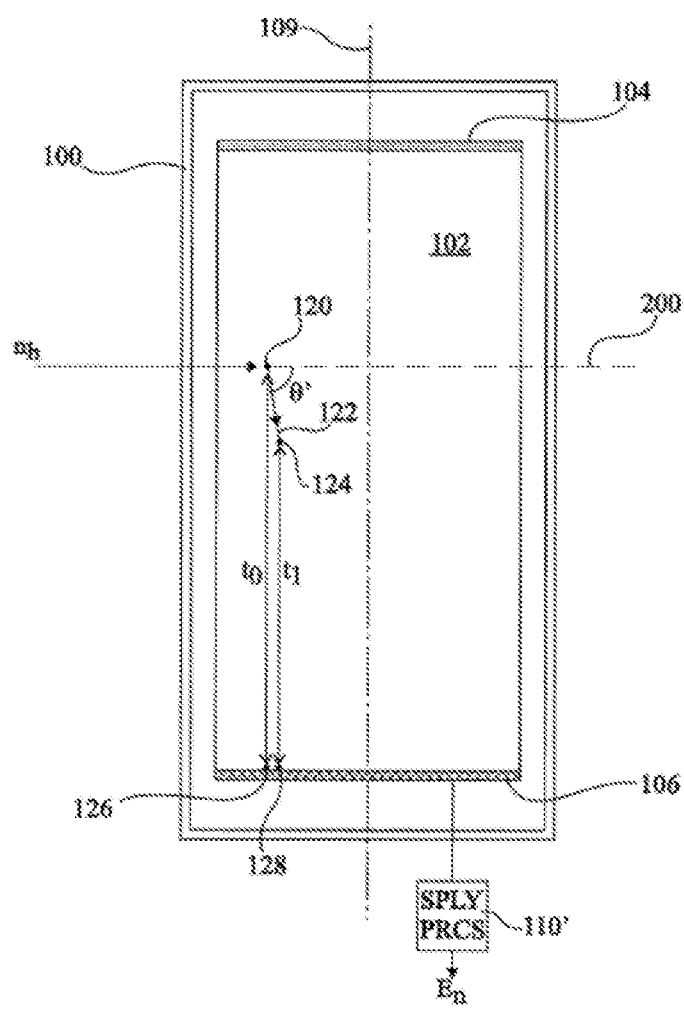
FIG. 2 is a schematic cross-sectional view of one embodiment of a device for measuring the energy of fast neutrons.

FIG. 2 is a schematic cross-sectional view of one embodiment of a device for measuring the energy of fast neutrons.

The device of FIG. 2 comprises the same elements as those of the device of FIG. 1, said elements being arranged in the same way with respect to one another, with the exception of the circuit 110, which has been replaced by a supply and processing circuit 110'. Elements that are the same and their arrangement will not be described again in detail. Only differences between the devices of FIGS. 1 and 2 will be highlighted.

Unlike the device of FIG. 1, the direction of incidence of the neutrons in the device of FIG. 2, the direction 200, is orthogonal to the anode-cathode direction. To determine the energy of an incident neutron $n_h$, the circuit 110' of FIG. 2 proceeds in the same way as the circuit 110 of FIG. 1, with the exception that instead of the angle θ, the circuit 110' determines the angle θ' between the direction 200 and the direction of the trace 120.

The circuit 110' determines the angle θ' from the positions of arrival of the electrons and from the difference t0–t1, while taking into account the speed at which the electrons move from this trace 120 to the anode.

The circuit 110 then determines the energy of the neutron $n_h$ from the energy $E_p$ and from the angle θ' using the relationship:

$$E_n = A \frac{E_p}{\cos^2 \theta'} \quad (4)$$

where A is the constant number mentioned above dependent on the ratio between the masses of the neutron and of the recoil nucleus.

Thus, a particularly precise measurement of the energy $E_n$ of the neutrons, and in particular of fast neutrons $n_h$, is obtained even when the angle θ' is close to 90°, and for example comprised between 80 and 89°. This may be explained in the following way.

If the trace 122 is in a plane orthogonal to the anode (case illustrated in FIG. 2) the orientation of the ionized trace 122 is close to the anode-cathode direction when the angle θ' is close to 90°. With this orientation of the trace, the difference t0–t1 between the times of arrival at the anode of the electrons generated along the trace is higher than with the orientation of FIG. 1. For example, for a neutron of 50 MeV, the difference t0–t1 typically exceeds 500 ns with the orientation of the trace in FIG. 2, whereas it is smaller than 50 ns with the orientation of the trace in FIG. 1. As a result, the computed difference t0–t1 is precise. It is thus possible to determine the angle θ' with precision. Specifically, the determined angle θ' is not indistinguishable from 90° provided that the anode detectors 126 and 128 reached by the electrons generated at the ends of the trace 122 are separate from each other. The resolution of the matrix array is chosen so that the detectors 126 and 128 are separate even for short traces and for angles close to 90°. By way of example, the matrix array of detectors has a resolution better than 0.5 mm. It is then possible to use relationship (4) to determine the energy $E_n$ of the neutrons with precision, while avoiding the division by zero that would result if the determined angle θ' were indistinguishable from 90°.

A device allowing a measurement of the energy of fast neutrons, the energy of the neutrons being able to be higher than 5 MeV, and for example higher than 200 MeV, or even higher than 600 MeV, is thus obtained. It will be noted that the trace may be located outside of a plane orthogonal to the anode. In this embodiment of the invention—and contrary to document EP 2708918 A1 mentioned with respect to the prior art—there is no solid converter, the conversion (i.e. the generation of electrons from the incident neutrons) being carried out directly in the gas contained in the cell. This therefore allows conversion efficiency to be improved and the trace left by the recoil nucleus to be reconstructed in 3D.

By way of example, the electric field, the nature and the pressure of the gas are chosen so that the speed of the electrons between the trace and the anode is comprised between 5 and 20 mm/µs, and is for example of the order of 10 mm/µs. By way of example, the gas 102 is a mixture of helium 4, $^4$He, and of carbon dioxide, $CO_2$, comprising between 4 and 6% $CO_2$. The absolute pressure of the gas is for example comprised between 500 mbar 1 bar, and preferably between 650 and 750 mbar. The field cage for example has a diameter comprised between 10 and 35 cm, and preferably of 10 cm, and a length comprised between 15 and 35 cm, and preferably of 25 cm. By way of example, the number of anode detectors is higher than 256×256, and for example equal to 960×960. By way of example, the precision of the measurement of the times of arrival of the electrons at the detectors is comprised between 16 and 40 ns.

As was mentioned above, the circuit 110' determines the energy $E_p$ depending on the ionization energy $E_i$ of the trace, via the relationship $E_p=E_i/Q$, where Q is the nuclear recoil quenching factor. By way of example, the factor Q may be a value $Q(E_i)$ measured during prior trials and expressed as a function of the ionization energy $E_i$ of the trace. By way of example, the circuit 110' comprises a memory in which various measured values $Q(E_i)$ of the factor Q are stored, or in which a mathematical relationship allowing values close to and for example within 10% of the measured values to be computed is stored. The lower the initial energy $E_p$ of the recoil nuclei, the lower the factor Q tends to be. Using measured $Q(E_i)$ values allows a precise measurement of the energy of fast neutrons to be obtained.

A device allowing the energy of fast neutrons, for example neutrons of more than 5 MeV, has been described above. However, in order to establish an energy spectrum of a neutron source for example, it may furthermore be desired to measure the energy of neutrons that are not fast, for example neutrons of less than 5 MeV, without however providing two different devices for this purpose.

Figure 3:
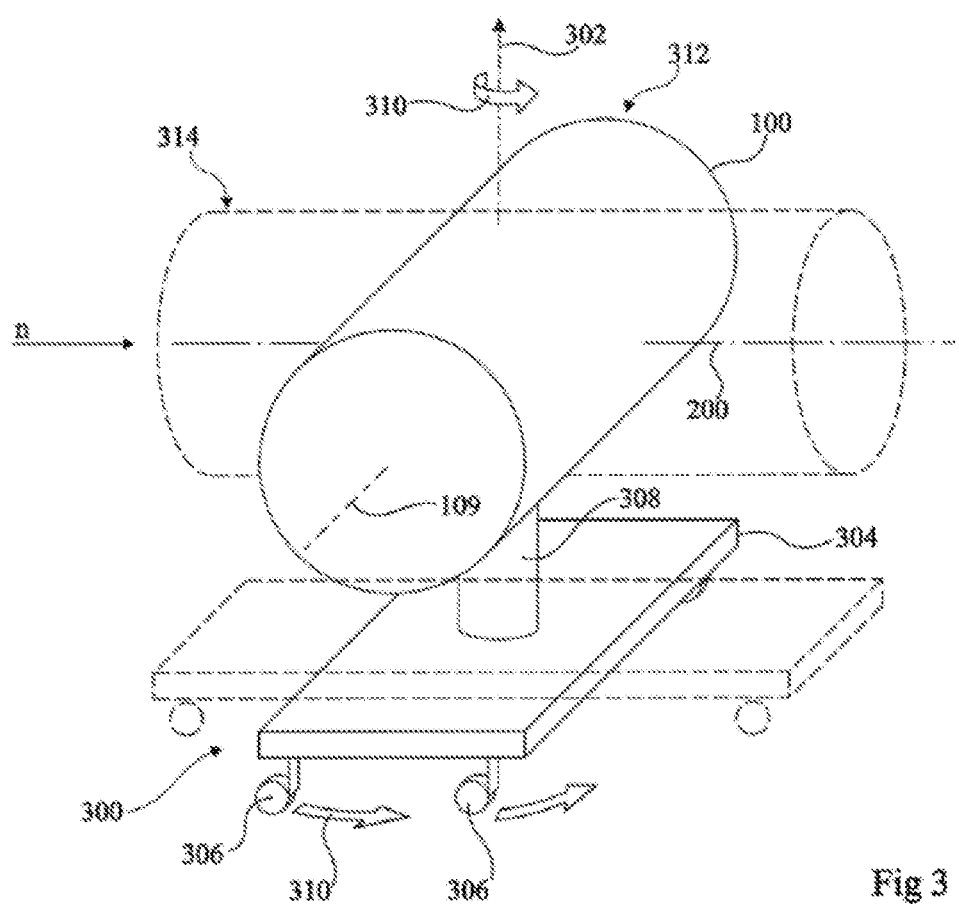
FIG. 3 is a schematic perspective view of one embodiment of a device for measuring neutron energy.

FIG. 3 is a schematic perspective view of one embodiment of a device for measuring the energy of neutrons, independently of whether they are fast or not.

The device comprises a device of the same type as that illustrated in FIGS. 1 and 2, comprising a gas enclosure 100 of axis 109 (anode-cathode direction). The direction 200 is also indicated. As was mentioned above, the device allows the energy of fast neutrons to be measured when the direction 200 is aligned with the direction of incidence of the neutrons.

The device furthermore comprises a rotary holder 300. The axis 302 of rotation of the holder 300 is orthogonal both to the direction 200 and to the anode-cathode direction. By way of example, the axis 302 is vertical, and the rotary holder 300 comprises a trolley 304 on pivoting wheels 306 and a linking unit 308 that securely joins the trolley and the enclosure 100. By way of variant, any other rotary holder of (vertical or non-vertical) axis parallel to the axis 302 may be used.

A rotation 310 of the device by one quarter of a revolution makes it possible to pass from the position (drawn with solid lines and designated by the reference 312) in which the direction 200 is aligned with the direction of incidence of the neutrons, to the position (drawn with dashed lines and designated by the reference 314) in which the anode-cathode direction is aligned with the direction of incidence of the neutrons.

In the position 312, the circuit 110' measures the energy of fast neutrons in the way described above with reference to FIG. 2, i.e. using the angle θ'. In the position 314, the circuit 110' measures the energy of non-fast neutrons in the same way as the circuit 110 in FIG. 1, i.e. using the angle θ.

Because the circuit 110' measures the energy of incident neutrons in the direction 200 and the energy of incident neutrons in the anode-cathode direction, it is possible to measure, with a single device, the energy of neutrons independently of whether they are fast or not. The rotary holder 300 allows this measurement to be carried out in a particularly simple way.

Preferably, in the position 314, the circuit 110' uses measured values $Q(E_i)$ of the nuclear recoil quenching factor dependent on the ionization energy $E_i$ of the trace.

Particular embodiments have been described. Various variants and modifications will appear obvious to those skilled in the art. In particular, although a particular gas was mentioned, it is possible to use any gas suitable for detecting neutrons by collision with a nucleus of the gas and ionization of a trace in the gas, for example a mixture of $C_4H_{10}$ and of $CHF_3$ comprising between 30 and 50% $CHF_3$, or a mixture of 70% $CF_4$ and of 30% $CHF_3$.

Furthermore, any anode and cathode configuration comprising a gas between the anode and cathode is possible, the enclosure being able to be cylindrical or not.

Although the device in FIG. 3 comprises a rotary holder, provision may also be made for any other means for orienting the device. In particular, provision could be made for the device to be devoid of rotary holder, for example if it is a portable device able to be oriented manually.

Although, in the embodiments described above, the neutrons all had the same direction of incidence orthogonal to the anode-cathode direction, the neutrons may also originate from a source of neutrons located close to the device. The neutrons then do not all have exactly the same direction of incidence. It will be understood that, when the direction of incidence of the neutrons is said to be "orthogonal" to the anode-cathode direction, this means that the direction of incidence is orthogonal to the anode-cathode direction to within 10%, and preferably to within 5%.

The invention claimed is:

1. A device for measuring the energy of neutrons incident in a first direction having an energy greater than 5 MeV, the device comprising a gas between a cathode and an anode, the anode comprising a matrix array of electron detectors, the first direction being orthogonal to the anode-cathode direction, and the device further comprising a circuit configured for:
    a) measuring the number, the positions, and the times of arrival of electrons;
    b) determining, from the positions and times of arrival, the angle θ' between the first direction and the direction of an ionized trace left by a nucleus of said gas after collision with one of the neutrons; and
    c) determining the energy of the neutron from the number of electrons and the angle θ'.

2. The device as claimed in claim 1, wherein said circuit is configured to, in step c):
    determine, from the number of electrons $N_e$, the ionization energy of the trace $E_i$, via the relationship $E_i=N_e*\Delta E$, where $\Delta E$ is the energy required to create an electron-ion pair in the gas; and
    determine the energy $E_n$ of the neutron via the relationship:

$$E_n = A\frac{E_P}{\cos^2\theta'}$$

wherein $E_p$ respects the relationship $E_p=E_i/Q(E_i)$, $Q(E_i)$ being the nuclear recoil quenching factor associated with the ionization energy of the trace $E_i$, and A is a constant coefficient dependent on the ratio between the mass of the neutron and the mass of said nucleus.

3. The device as claimed in claim 1, further configured for measuring the energy of neutrons incident in a second direction, the second direction being parallel to the anode-cathode direction, wherein said circuit is configured to:
   a) measure the number, the positions, and the times of arrival of the electrons;
   b') determine, from the positions and times of arrival, the angle θ between the second direction and the direction of an ionized trace left by a nucleus of said gas struck by one of the neutrons; and
   c') determine the energy of the neutron from the number of electrons and the angle θ.

4. The device as claimed in claim 3, wherein said circuit is configured to:
   determine, from the number of electrons $N_e$, the ionization energy of the trace $E_i$, via the relationship $E_i = N_e * \Delta E$, where $\Delta E$ is the energy required to create an electron-ion pair in the gas; and
   determine the energy $E_n$ of the neutron via the relationship:

$$E_n = A \frac{E_P}{\cos^2\theta}$$

wherein $E_p$ respects the relationship $E_p = E_i / Q(E_i)$, $Q(E_i)$ being the nuclear recoil quenching factor associated with the ionization energy of the trace $E_i$, and
   A is a constant coefficient dependent on the ratio between the mass of the neutron and the mass of said nucleus.

5. The device as claimed in claim 3, further comprising a rotary holder having an axis of rotation orthogonal to the first direction and to the second direction, a rotation of one quarter of a revolution about the axis of rotation making the device pass from an orientation in which the first direction is parallel to the direction of incidence of the neutrons to an orientation in which the second direction is parallel to the direction of incidence of the neutrons.

6. The device as claimed in claim 1, wherein the cathode and the anode are located on opposite sides of a cylindrical field cage arranged to produce a uniform electric field.

7. The device as claimed in claim 6, wherein the field cage has a diameter between 10 and 35 cm and a length between 15 and 35 cm.

8. The device as claimed in claim 1, wherein the gas is a mixture of helium 4 and of $CO_2$ comprising between 4 and 6% $CO_2$.

9. The device as claimed in claim 1, wherein the precision of the measurement of the times of arrival of the electrons is between 16 and 40 ns.

10. A method for measuring the energy of neutrons incident in a direction having an energy greater than 5 MeV, the method comprising:
    a) providing a gas between a cathode and an anode, the anode comprising a matrix array of electron detectors;
    b) orienting the anode-cathode direction orthogonal to the direction of incidence of the neutrons;
    c) measuring the number, the positions, and the times of arrival of electrons coming from gas on the matrix array;
    d) determining, from the positions and times of arrival, the angle θ' between the direction of incidence of the neutrons and the direction of an ionized trace left by a nucleus of said gas after collision with one of the neutrons; and
    e) determining the energy of the neutron from the number of electrons and from the angle θ'.

11. The method as claimed in claim 10, wherein step e) comprises:
    determining, from the number of electrons $N_e$, the ionization energy of the trace $E_i$, via the relationship $E_i = N_e * \Delta E$, where $\Delta E$ is the energy required to create an electron-ion pair in the gas; and
    determining the energy $E_n$ of the neutron via the relationship:

$$E_n = A \frac{E_P}{\cos^2\theta'}$$

wherein $E_p$ respects the relationship $E_p = E_i / Q(E_i)$, $Q(E_i)$ being the nuclear recoil quenching factor associated with the ionization energy of the trace $E_i$, and
    A is a constant coefficient dependent on the ratio between the mass of the neutron and the mass of said nucleus.

12. The method as claimed in claim 10, further comprising successively:
    b') orienting the anode-cathode direction parallel to the direction of incidence of the neutrons; and
    f) implementing steps c), d) and e).

* * * * *